(12) United States Patent
Maeda et al.

(10) Patent No.: US 8,087,974 B2
(45) Date of Patent: Jan. 3, 2012

(54) MANUFACTURING METHOD FOR WORM WHEEL, AND WORM GEAR REDUCER

(75) Inventors: Atsushi Maeda, Gunma (JP); Kazuo Chikaraishi, Gunma (JP)

(73) Assignee: NSK Ltd., Tokyo (JP)

( * ) Notice: Subject to any disclaimer, the term of this patent is extended or adjusted under 35 U.S.C. 154(b) by 942 days.

(21) Appl. No.: 11/274,170

(22) Filed: Nov. 16, 2005

(65) Prior Publication Data
US 2006/0196295 A1 Sep. 7, 2006

(30) Foreign Application Priority Data
Nov. 16, 2004 (JP) ................................ 2004-332322

(51) Int. Cl.
*B24B 1/00* (2006.01)
(52) U.S. Cl. .......................................... 451/47; 451/147
(58) Field of Classification Search .................. 451/47, 451/48, 147–149; 409/66–70
See application file for complete search history.

(56) References Cited

U.S. PATENT DOCUMENTS

| 3,897,661 | A | * | 8/1975 | Inatomi et al. ................... 451/47 |
| 4,850,155 | A | * | 7/1989 | Sulzer .............................. 451/47 |
| 5,647,790 | A | | 7/1997 | Horiutchi et al. |

FOREIGN PATENT DOCUMENTS

| EP | 1 609 694 A1 | 12/2005 |
| JP | 2000-84747 A | 3/2000 |
| JP | 2002-254478 A | 9/2002 |
| JP | 2002331423 A | 11/2002 |
| JP | 2002349674 A | 12/2002 |
| JP | 2003-334724 A | 11/2003 |
| WO | WO 2004/083015 A1 | 9/2004 |
| WO | WO2004081156 A1 | 9/2004 |

OTHER PUBLICATIONS

Japanese Office Action dated Feb. 4, 2011 for Patent Application No. P2004-332322 with English translation.
Translation of Japanese Office Action for JP Patent Appln. No. 2004-332322, dated Jun. 17, 2011.
Japanese Office Action for JP 2004-332322, issued Jun. 17, 2011.

* cited by examiner

*Primary Examiner* — Dung Van Nguyen
(74) *Attorney, Agent, or Firm* — Sughrue Mion, PLLC

(57) ABSTRACT

A manufacturing method for a worm wheel, the worm wheel meshed with an operational worm at usage, has steps of preparing a worm wheel, in which at least a surface layer of a tooth portion is made of synthetic resin, preparing a machining worm, in which pitch of teeth of the machining worm in an axial direction thereof is the same as that of an operational worm, diameters of tip and root portions of the tooth of the machining worm are equal to or more than those of the operational worm and abrasive grains are provided on a surface of the machining worm by means of electro-deposition, disposing the machining worm in a twisting position relative to the worm wheel and rotating the machining worm and the worm wheel with meshing each other so as to machining the tooth portion of the worm wheel.

5 Claims, 12 Drawing Sheets

MANUFACTURING METHOD FOR WORM WHEEL, AND WORM GEAR REDUCER

The present invention claims foreign priority to Japanese patent application No. 2004-332322, filed on Nov. 16, 2004, the contents of which is incorporated herein by reference.

BACKGROUND OF THE INVENTION

1. Field of the Invention

The present invention relates to a worm gear reducer which is used being incorporated into an electric power steering device, a nursing bed and so forth. The present invention also relates to a manufacturing method for a worm wheel composing the worm gear reducer.

2. Description of the Background Art

In order to reduce a force needed for operating a steering wheel when a driver gives a steering angle to vehicle wheels to be steered (Vehicle wheels to be steered are usually front wheels except for a special vehicle such as a forklift), a power steering device is generally used. As for this power steering device, an electric power steering device, in which an electric motor is used as an assisting power source, has recently spread. As compared with a hydraulic type power steering device, the electric type power steering device is advantageous as follows. The electric type power steering device can be made compact and further the weight can be reduced. Furthermore, an intensity of assisting torque can be easily controlled. Therefore, a loss of power caused in an engine can be decreased. In this case, a reduction gear is incorporated into this electric power steering device. Concerning this reduction gear, it is conventional to use a reversible type worm gear reducer having a large lead angle, the power transmitting direction of which can be reversed.

FIGS. 17 and 18 are views showing an example of the worm gear reducer of the background art into which the above electric type power steering device is incorporated. This worm gear reducer is provided in the reduction gear housing 1 which is fixed to the electric motor 1. The worm gear reducer includes: a worm shaft 4, in the intermediate portion in the axial direction of which the worm 3 is provided; and a worm wheel 5 meshed with this worm 3. The worm shaft 4 is pivotally supported inside the housing 2 by a pair of ball bearings 6, 6 which are outwardly engaged with both end portions in the axial direction of the worm shaft 4. When one end portion of the worm shaft 4, that is, the left end portion of the worm shaft 4 in FIG. 17, is connected with the output shaft 7 of the electric motor 1, this worm shaft 4 can be freely rotated being driven.

The worm wheel 5 is pivotally arranged inside the housing 2, and the rotary central axis of the worm wheel 5 itself is arranged at a twisting position with respect to the worm shaft 4. When the tooth portion 8 formed in the outer circumferential edge portion of the worm wheel 5 is meshed with the worm 3, torque can be freely transmitted between the worm wheel 5 and the worm shaft 4. In this connection, in the example shown in the drawing, the inner end portion and the intermediate portion in the radial direction of the worm wheel 5 are made of metal, and the outer end portion (the hatched portion shown in FIGS. 17 and 18) in the radial direction including the tooth portion 8 is made of synthetic resin 9. Due to the above structure, it is possible to reduce an intensity of the knocking and sliding noise generated in the meshing portion at the time of operation. This worm wheel 5 is outwardly fixed to an intermediate portion of the steering shaft 10. Due to this structure, it is possible to transmit a rotating drive force generated by the electric motor 1 to the steering shaft 10 via the worm gear reducer.

When the lead angle θ defined between the worm 3 and the worm wheel 5 is sufficiently large, a reverse operation of the worm gear reducer can be conducted. That is, a rotation can be transmitted from the worm wheel 5 to the worm 3. In this connection, in order to increase the lead angle θ between the worm 3 and the worm wheel 5 while the reduction ratio of the worm gear reducer and the outer diameter of the worm wheel 5 are being maintained constant, as shown in FIGS. 19A and 19B, it is necessary to decrease the outer diameter of the worm 3. Accordingly, in the worm gear reducer shown in FIGS. 17 and 18, as compared with the worm gear reducer in which the reversible operation not needed and the lead angle θ thereof is small, the outer diameter of the operational worm 3 is greatly decreased.

The electric type power steering device including the aforementioned worm gear reducer is operated as follows. When a driver operates a steering wheel so as to give a steering angle to the wheels to be steered, the steering shaft 10 is rotated. Then, a torque sensor (not shown) detects a rotary direction and torque of this steering shaft 10 and sends a signal expressing the thus detected value to a controller (not shown). This controller energizes the electric motor 1 and rotates the steering shaft 10 via the worm gear reducer in the same rotating direction as that of the operation of the steering wheel. As a result, the steering shaft 10 is rotated being given an assisting torque, which is generated by the electric motor 1 when it is energized, in addition to the torque generated by the operation of the steering wheel. Therefore, it is possible to decrease an intensity of torque, which is required for the driver to operate the steering wheel, by an intensity of torque generated by the assisting power. On the other hand, for example, when the electric motor 1 connected with the worm shaft 4 is out of order, the worm gear reducer can be reversed by operating the steering wheel. Due to the foregoing, it is possible to prevent the occurrence of a case in which the steering wheel can not be operated because of the problem of the electric motor 1.

In this connection, in the case where the worm wheel 5 having the above-described worm gear reducer is manufactured, it is common that the tooth portion 8 of this worm wheel 5 is machined with a hob cutter as described in Japanese Patent Unexamined Publication Nos. JP-A-2002-254478 and JP-A-2003-334724. FIG. 20 is a view showing circumstances in which the tooth portion 8 is machined with the hob cutter 11. In the case where this tooth portion 8 is machined, as shown in the drawing, the central axis of the intermediate material 12 (the worm wheel 5 in the state before the tooth portion is formed) of the worm wheel 5 and the central axis of the hob cutter 11 are arranged at positions so that the two central axes can be twisted from each other. In this state, the intermediate material 12 and the hob cutter 11 are respectively rotated at speeds according to the gear ratio of the worm gear reducer. Under this condition, the outer circumferential edge portion of the intermediate material 12 is cut with the hob cutter 11 to form the tooth portion 8 in the outer circumferential edge portion.

In the case where the tooth portion 8 is formed as described above, when the hob cutter 11 is used, the diameter of which is the same as that of the worm 3, it is possible to extend the contact area of the tooth portion 8, which has already been machined, with the worm 3, that is, the contact pressure can be decreased. Therefore, the durability of the worm gear reducer can be sufficiently ensured. However, as described before, in the case of the worm gear reducer incorporated into the electric type power steering device, it is necessary to make the electric type power steering device operate reversibly, that is, it is necessary to make the lead angle θ larger. Therefore, as compared with the worm gear reducer which is not reversibly operated, the lead angle θ of which is small, in the case of the worm gear reducer incorporated into the electric type power steering device, the outer diameter of the worm 3 is greatly decreased. Therefore, since the hob cutter 11 has pluralities of slits along with an axial direction thereof, when using the hob cutter 11 the diameter of which is the same as that of the worm 3, it becomes impossible to sufficiently ensure the mechanical strength of the hob cutter 11.

For the above reasons, the hob cutter 11, the diameter of which is larger than that of the worm 3, is actually used. However, only when the hob cutter 11 of large diameter is used as described above, the contact area of the tooth portion 8, which has already been machined, with the worm 3 (shown in FIGS. 17 to 19) is so small (it leads increase of contact pressure) that it becomes difficult to ensure the durability of the worm gear reducer. Therefore, in the actual case, after the tooth portion 8 has been machined with the hob cutter 11, the tooth portion 8 and the worm 3 are meshed with each other. Then, while a load is being given to this meshing portion, the worm gear reducer is driven being subjected to the running-in process. Due to the foregoing, the tooth face of the tooth portion 8 is machined, so that the contact area of the tooth portion 8 with the worm 3 can be increased. However, when the worm gear reducer is driven being subjected to running-in process as described above, the manufacturing cost of the worm gear reducer is raised.

Furthermore, recently, in order to enhance the efficiency of the worm gear reducer, the tooth face of the worm 3 is subjected to the mirror-finish process in many cases. In the case of the worm 3, the tooth face thereof is subjected to the mirror-finish process, even when this worm 3 is driven being subjected to the running-in process, it is impossible to cut the tooth face of the tooth portion 8. Accordingly, there is a possibility that an object of conducting the running-in process on the worm 3 can not be accomplished.

SUMMARY OF THE INVENTION

The present invention has been accomplished in view of the above circumstances. It is an object of the present invention to realize a manufacturing method for a worm wheel in which a contact area of the contact portion of the worm wheel with the worm can be sufficiently extended. It is another object of the present invention to realize a worm gear reducer in which a contact area of the contact portion of the worm wheel with the worm can be sufficiently extended.

According to a first aspect of the present invention, there is provided a manufacturing method for a worm wheel, the worm wheel meshed with an operational worm at usage, comprising the steps of:

preparing a worm wheel, in which at least a surface layer of a tooth portion is made of synthetic resin;

preparing a machining worm, in which pitch of teeth of the machining worm in an axial direction thereof is the same as that of an operational worm, diameters of tip and root portions of the tooth of the machining worm are equal to or more than those of the operational worm and abrasive grains are provided on a surface of the machining worm by means of electro-deposition;

disposing the machining worm in a twisting position relative to the worm wheel; and rotating the machining worm and the worm wheel with meshing each other so as to machining the tooth portion of the worm wheel.

Note that it is sufficient that at least the tooth face of the tooth portion which contacts with the operation worm is made by synthetic resin.

In this connection, the machining worm, in which the tooth pitch in the axial direction of which is the same and the diameters of the tip and root portions of which are the same as those of the operational worm, means that the shape and size of the machining worm are the same as those of the operational worm.

According to a second aspect of the present invention, as set forth in the first aspect of the present invention, it is preferable that the diameter of the tip and root portions of the machining worm are a little larger than the diameters of the tip and root portions of the operational worm.

According to a third aspect of the present invention, as set forth in the first aspect of the present invention, it is preferable that the manufacturing method for the worm wheel, further comprising the step of:

prior to the step of machining of the tooth portion of the worm wheel, preparing a cylindrical intermediate material for the worm wheel; and forming a shape of an outer peripheral face of the intermediate material into a shape close to a shape of the tooth portion of the worm wheel relative to the original cylindrical shape of the intermediate material, wherein the forming of the shape of the outer peripheral face of the intermediate material is conducted by other than the machining worm.

According to a fourth aspect of the present invention, as set forth in the first aspect of the present invention, it is preferable that the synthetic resin of the worm wheel includes glass fiber.

According to a fifth aspect of the present invention, as set forth in the first aspect of the present invention, it is preferable that a shape of the operational worm is a cylindrical or a middle-recessed drum shape which has a large diameter portions at both ends thereof and a small diameter portion at a middle thereof.

According to a sixth aspect of the present invention, as set forth in the first aspect of the present invention, it is preferable that the tooth portion of the worm wheel is machined with the machining worm while a machining portion is cooled by air without using machining oil.

According to a seventh aspect of the present invention, there is provided a worm gear reducer, comprising:

an operational worm; and a worm wheel meshing with the operational worm, at least a surface layer of a tooth portion thereof being made of synthetic resin, wherein the worm wheel is formed by disposing a machining worm in a twisting position relative to the worm wheel and rotating the machining worm and the worm wheel with meshing each other so as to machining the tooth portion of the worm wheel, and wherein pitch of teeth of the machining worm in an axial direction thereof is the same as that of an operational worm, diameters of tip and root portions of the tooth of the machining worm are equal to or more than those of the operational worm and abrasive grains are provided on a surface of the machining worm by means of electro-deposition.

Especially, in the worm gear reducer according to the seventh aspect of the present invention, the worm wheel is manufactured by the manufacturing method according to any one of the first through sixth aspects of the present invention.

According to an eighth aspect of the present invention, as set forth in the seventh aspect of the present invention, it is preferable that surface roughness Ra on a worm tooth face of the tooth portion is 0.1 μm or less. Note that the surface roughness Ra (arithmetical mean roughness) is defined in Japanese industrial Standard (JIS) as JIS B 0601-1994. When the above constitution is adopted, it is possible to reduce a sliding resistance of the meshing portion of the worm wheel with the worm, and the worm gear reducer can be highly effectively operated.

According to a ninth aspect of the present invention, there is provided a machining worm for machining a worm wheel meshed with an operational worm, comprising:

a tooth portion in which pitch of teeth in an axial direction thereof is the same as that of an operational worm, diameters of tip and root portion of the tooth are equal to or more than those of the operational worm, wherein abrasive grains are provided on a surface of the machining worm by means of electro-deposition.

As described above, in the case of the manufacturing method for a worm wheel of the present invention, concerning the tool used for machining the tooth portion of the worm wheel, a machining worm is used, the shape and size of which are substantially the same as those of the operational worm. Therefore, even when the running-in process described before is not conducted after machining has been conducted by the worm used for machining, it is possible to extend a contact area of the worm wheel after machining with the worm at the time of use can be extended, that is, the contact pressure can be decreased. Different from the case in which the hob cutter is used, according to the present invention, the tooth portion formed on the outer circumferential face of the machining worm is spirally continued and no slits are formed in the middle. Therefore, even when the machining worm is used, the shape and size of which are substantially the same as those of the operational worm, in other words, even when the machining worm, of which outer diameter is small, is used, the mechanical strength of the machining worm can be sufficiently ensured.

In the worm gear reducer of the present invention described above, the worm wheel manufactured by the manufacturing method of the present invention is used. Therefore, it is possible to extend a contact area of the meshing portion of the worm wheel with the worm. Accordingly, the durability of the worm gear reducer can be sufficiently ensured.

In a case where executing the manufacturing method for a worm wheel of the present invention, as described in the second aspect of the present invention, it is preferable that the tip diameter and the root diameter of the tooth portion of the machining worm are respectively a little larger than the diameters of the tip and the root of the worm meshed with the operational worm wheel, for example, the tip diameter and the root diameter of the machining worm are respectively larger than those of the operational worm by 1 to 10%, more preferably by 1 to 3%.

Due to the foregoing, a clearance of the worm gear reducer can be made a positive value (>0). Wherein the clearance of the worm gear reducer is defined as a distance along with a direction which is commonly perpendicular to central axes of the worm wheel and the operational worm, and the clearance is the distance between a circle of a tooth root of the worm wheel and a circle of a tooth tip of the operational worm, or defined between a circle of the tooth tip of the worm wheel and a circle of the tooth root of the operational worm, when meshing the worm wheel after the completion of machining worm wheel with the operation worm.

In general, when the worm gear reducer is used, it is possible to prevent the occurrence of interference of the tip (root) of the operational worm with the root (tip) of the worm wheel in the case where the clearance of the worm gear reducer is positive (>0) relative to a case where the clearance of the worm gear reducer is zero. As a result, it is possible to prevent the meshing portion of the worm with the worm wheel from being locked.

According to the second aspect of the present invention, it is possible to prevent the tip (root) of the worm wheel after the completion of machining from interfering with the root (tip) of the operational worm. As a result, it is possible to prevent the meshing portion of the worm with the worm wheel from being locked. Further, by the entire meshing portion of the worm wheel with the worm, it is possible to generate a gap between the tip (root) of the worm wheel and the root (tip) of the worm at all times. Therefore, lubricant can easily proceed to a position between the tip (root) of the worm wheel and the root (tip) of the worm. Accordingly, the meshing portion can be lubricated in an excellent condition, and the durability of the worm gear reducer can be sufficiently ensured.

When executing the manufacturing method for a worm wheel of the present invention, as described in the third aspect of the present invention, prior to machining of the tooth portion of the worm wheel, it is preferable to prepare a cylindrical intermediate material for the worm wheel, and forming a shape of an outer peripheral face of the intermediate material into a shape close to a shape of the tooth portion of the worm wheel relative to the original cylindrical shape of the intermediate material. Wherein the forming of the shape of the outer peripheral face of the intermediate material is conducted by other than the machining worm.

In this case, for example, the forming of the shape of the outer peripheral face of the intermediate material is conducted is injection molding of the synthetic resin or machining conducted by a hob cutter of which diameter is larger than that of the machining worm.

Due to the foregoing, a machining removal of the machining worm can be decreased. Therefore, life of the machining worm can be prolonged, and further the entire machining time can be reduced. Accordingly, the manufacturing cost can be decreased. Especially, when injection molding of synthetic resin is adopted for the means except for the machining conducted by the machining worm, it is possible to enhance the yield of material (synthetic resin). Accordingly, the manufacturing cost can be further reduced.

According to the fourth aspect of the present invention, even in the case in which synthetic resin constituting the objective worm wheel includes glass fiber, the manufacturing method for a worm wheel of the present invention can be preferably executed.

That is, when synthetic resin composing the worm wheel contains glass fiber, the mechanical strength and the rigidity can be enhanced. Accordingly, the durability of the tooth portion made of this synthetic resin can be enhanced. However, since the cutting resistance (and the grinding resistance) of the synthetic resin containing glass fiber is higher than that of the synthetic resin not containing glass fiber, when machining is conducted with a hob cutter having small diameter, it is difficult to sufficiently ensure the durability of this hob cutter. On the other hand, since the mechanical strength of the machining worm of the present invention is sufficiently higher than that of the hob cutter of the same size, even when synthetic resin containing glass fiber is ground (or cut), it is possible to ensure a sufficiently high durability. Therefore, according to the present invention, it is possible to manufacture a highly durable worm wheel made of synthetic resin containing glass fiber at low manufacturing cost.

According to the fifth aspect of the present invention, the manufacturing method for the worm wheel of the present invention can be executed even when the operational worm is a cylindrical worm or a middle-recessed drum shaped worm.

Wherein the meddle-recessed drum shape has a large diameter portions at both ends thereof and a small diameter portion at middle thereof. In this case, the middle-recessed drum worm is defined as a worm in which the shape of bus line of the root (broken line β) is a middle-recessed drum shape irrespective of the shape of a bus line of the tip (solid line α) as a model is shown in FIGS. 21A and 21B.

In this case, as the machining worm, a cylindrical worm or a middle-recessed drum worm is adopted in accordance with the cylindrical or middle-recessed drum shaped operational worm.

Further, when the manufacturing method for a worm wheel of the present invention is executed, according to the sixth aspect of the present invention, it is preferable that machining by the machining worm is conducted without using machining lubricant, that is, by dry-machining while the machined portion is being cooled by air (air-cooling).

Due to the foregoing, the tooth portion can be effectively machined by the machining worm. Concerning abrasive grains which are electro-deposited on the surface of the machining worm, about half of the outer diameter of the abrasive grain is embedded in the surface of the machining worm. Therefore, at the time of machining the tooth portion, the feeding speed of the machining worm toward the worm wheel (the intermediate material of the work wheel) must be set lower than about a half of the outer diameter of the abrasive grain. Accordingly, in order to prevent the deterioration of the machining efficiency, it is necessary to increase the rotating speed of the machining worm to a value 5 to 10 times as high as the rotating speed of the conventional hob cutter. Of course, the rotating speed of the intermediate material is increased by the same ratio as that of the rotating speed of the machining worm. However, the following problems may be encountered. When machining is conducted at high speed as described above, a quantity of heat generated from the machined portion is increased. Accordingly, synthetic resin to be machined is melted. As a result, clogging is caused in the machining worm, and it becomes difficult to effectively conduct machining after occurring of the clogging. In order to solve the above problems, machining conducted by the machining worm is executed by means of dry-machining while air-cleaning is being conducted on the portion to be machined. Then, the synthetic resin, which has been melted in the above process, can be made into a film-shape by quenching and blown away. Therefore, it is possible to prevent the occurrence of clogging of the machining worm, and the tooth portion can be effectively machined.

In a case where the worm gear reducer of the present invention is executed, according to the eighth aspect of the present invention, it is preferable that the surface roughness Ra of the tooth face of the worm is 0.1 μm or less.

DETAILED DESCRIPTION OF THE PREFERRED EMBODIMENTS

Embodiment 1

Figure 17:
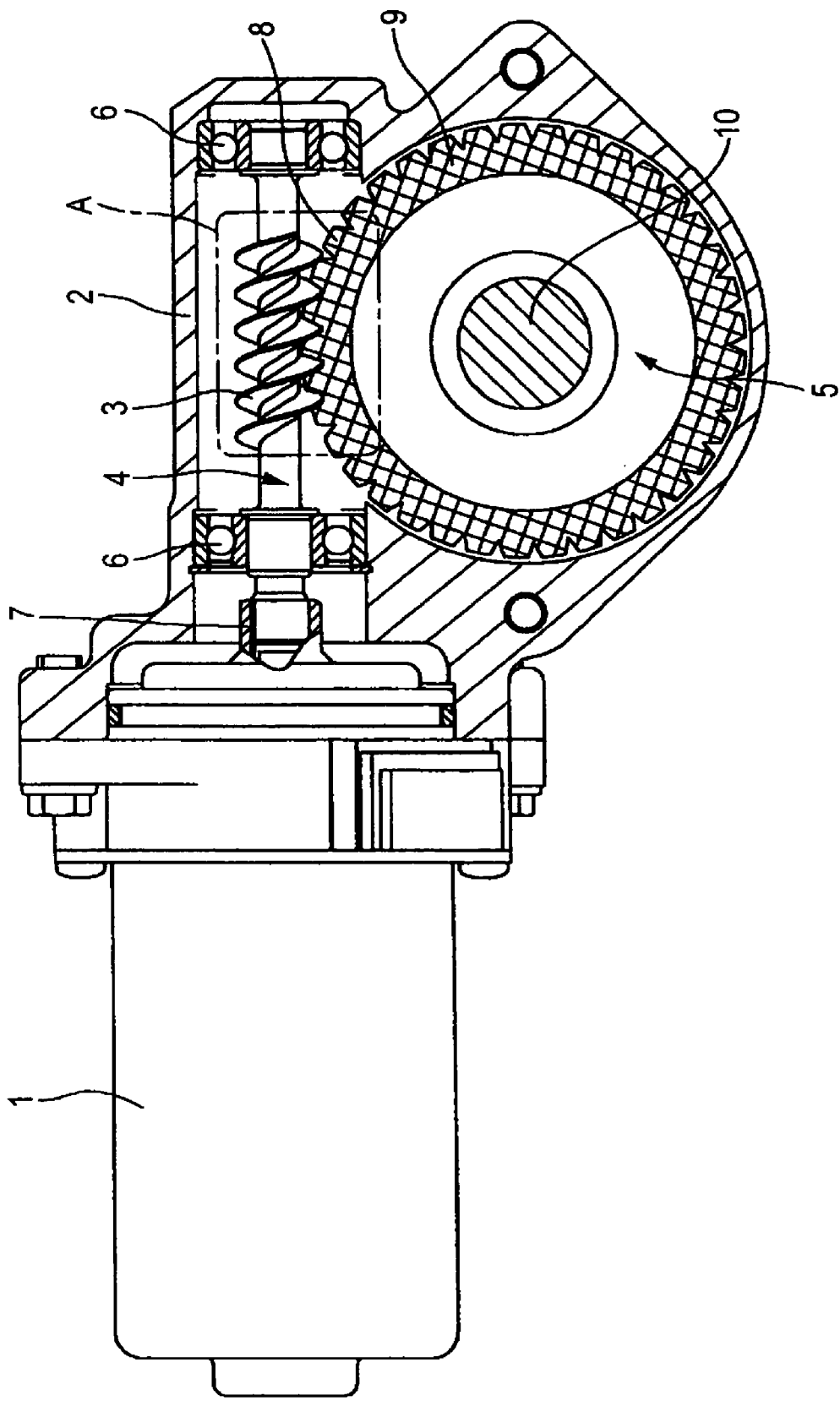
FIG. 17 is a sectional view showing a portion of a power steering device into which a worm gear reducer is incorporated.
Figure 18:
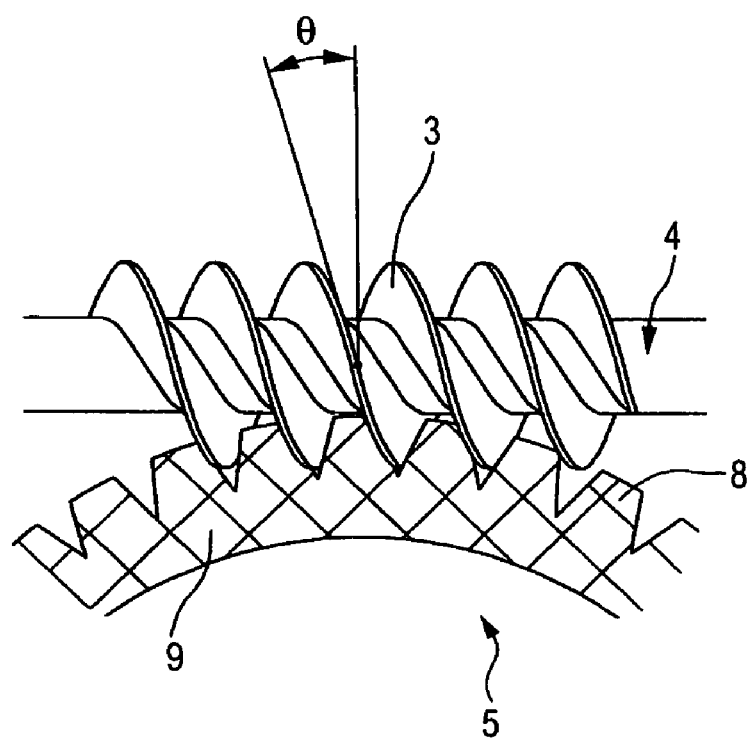
FIG. 18 is an enlarged view of portion A in FIG. 17.
Figure 19A:
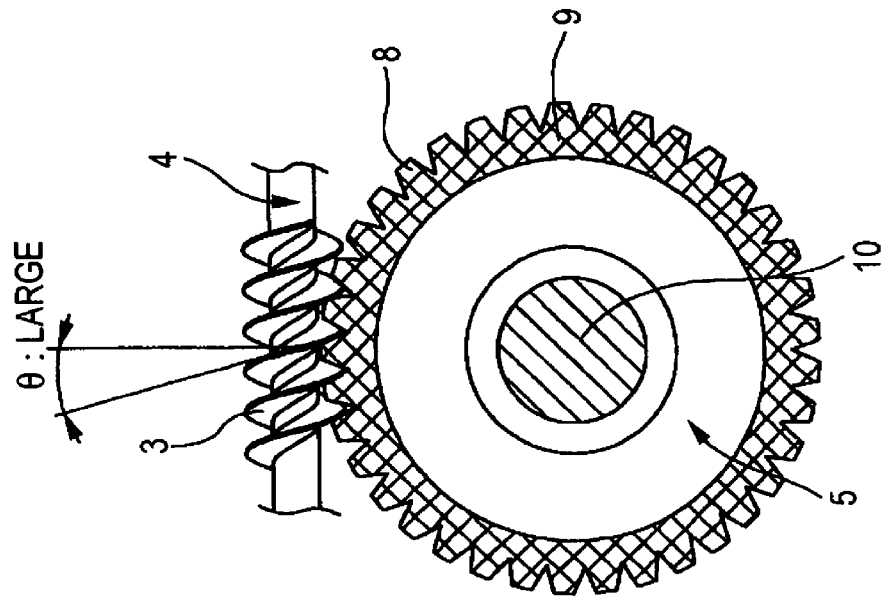
FIGS. 19A and 19B are partial sectional views for explaining a relation between the outer diameter of the worm and the lead angle θ.
Figure 19B:
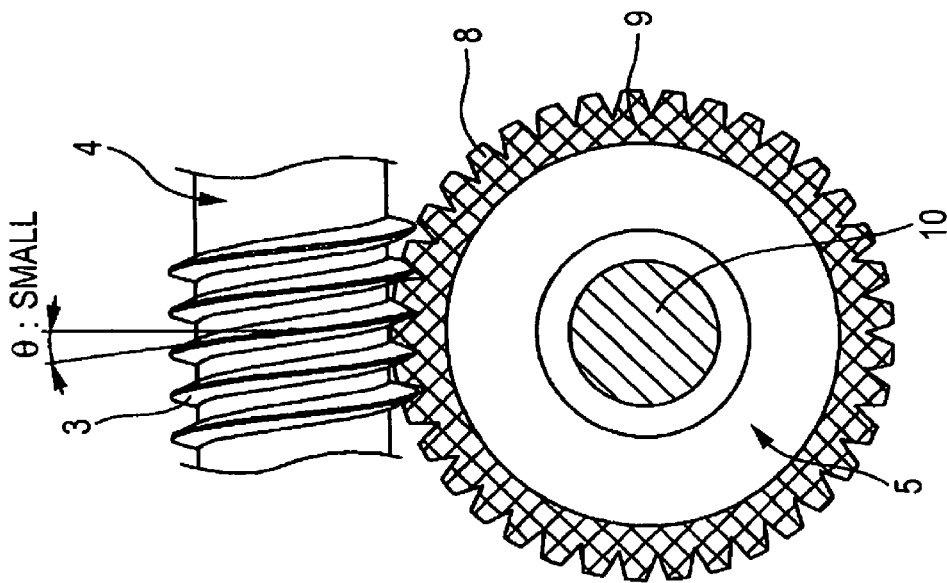

FIGS. 1 to 6 are views showing Embodiment 1 of the present invention which corresponds to the first and fourth through eighth aspects of the present invention. In this connection, the characteristics of this embodiment are the manufacturing method for a worm wheel 5a and the structure of a worm gear reducer including the worm wheel 5a. The structure and operation of the other portions are the same as those of the conventional structure shown in FIG. 17. Therefore, the duplicated drawings and explanations are omitted or simplified here, and the characteristic portions of this embodiment will be mainly explained as follows.

Figure 1A:
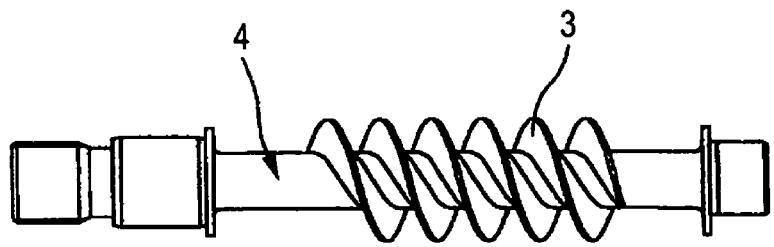
FIG. 1A is a front view of an operational worm according to Embodiment 1 of the present invention.
Figure 1B:
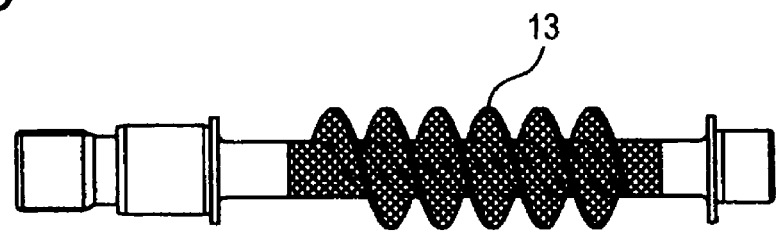
FIG. 1B is a front view of a machining worm according to Embodiment 1 of the present invention.
Figure 2:
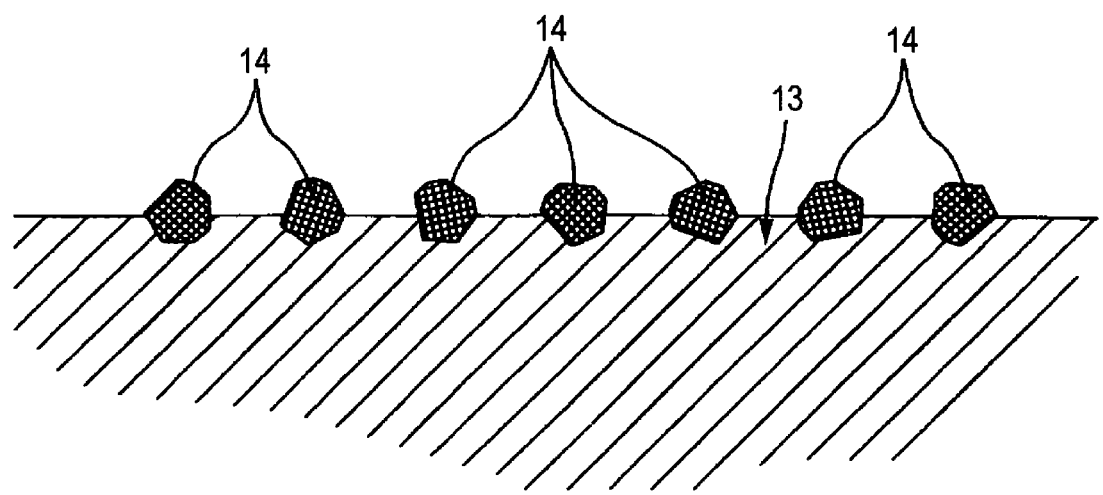
FIG. 2 is an enlarged sectional view of a surface layer portion of the machining worm.
Figure 3:
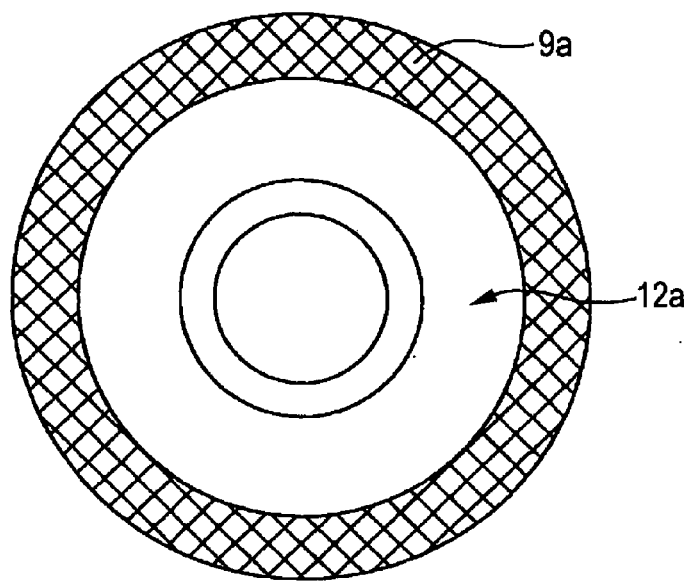
FIG. 3 is a front view showing an intermediate material of a worm wheel.
Figure 6:
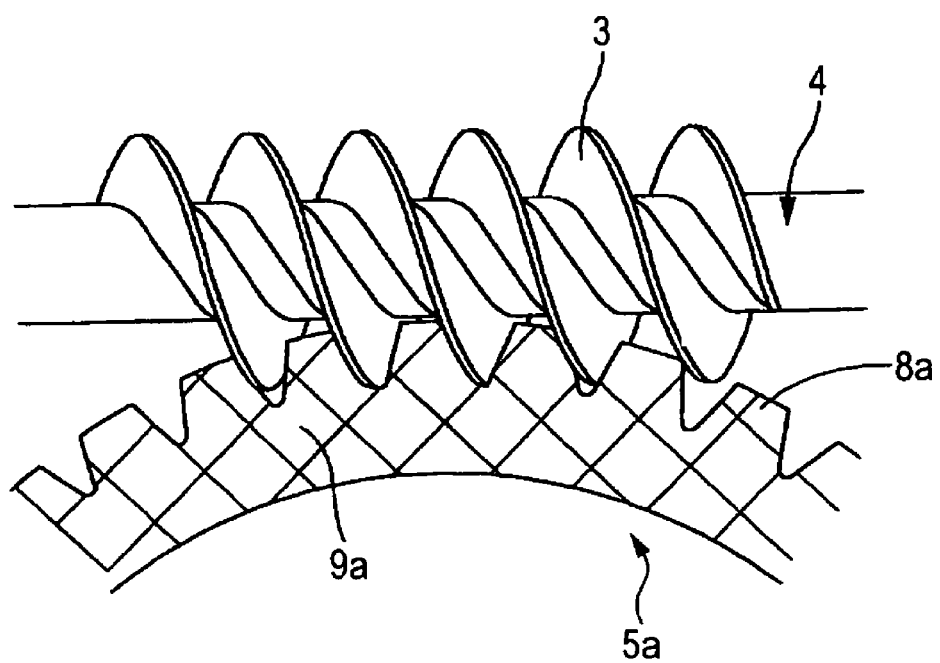
FIG. 6 is an enlarged view corresponding to portion A in FIG. 17 which shows a state in which the worm wheel after machining and the operational worm are meshed with each other.
Figure 7A:
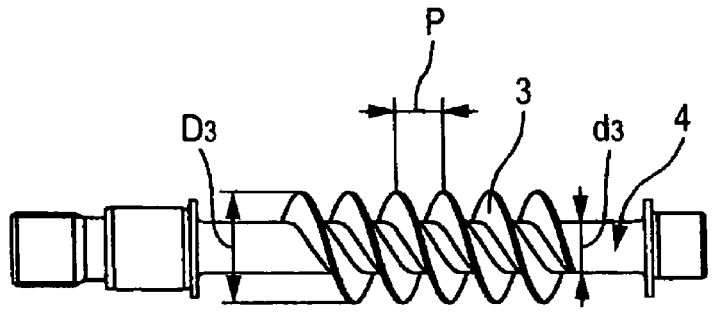
FIG. 7A is a front view showing the operational worm according to Embodiment 2 of the present invention.
Figure 7B:
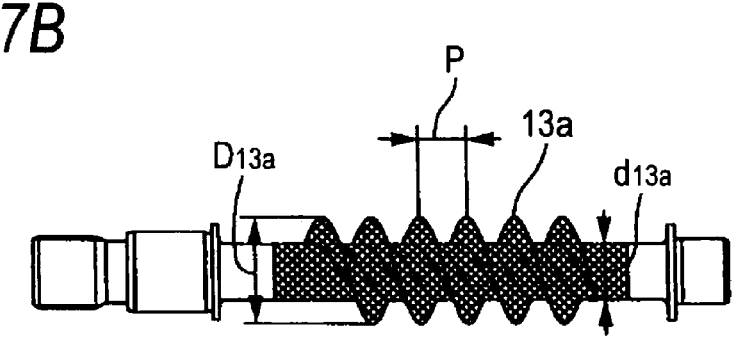
FIG. 7B is a front view of the machining worm according to Embodiment 2 of the present invention.

In this embodiment, as the tool used for machining the tooth portion 8a of the worm wheel 5a, the machining worm 13 shown in FIG. 1B is used. This machining worm 13 is composed in such a manner that a large number of abrasive grains 14, 14 (shown only in FIG. 2) are electro-deposited on the surface thereof, of which shape and size are the same as those of the operational worm 3 meshed with the tooth portion 8a of the worm wheel at the time of use as shown in FIGS. 1A and 6. In this connection, the fine hatched portions shown in FIGS. 1B and 4, the portions shown in FIGS. 1B and 4, which can be seen as if they were painted out black, are portions in which a large number of abrasive grains 14, 14 are electro-deposited. In this embodiment, the intermediate material shown in FIG. 3, the outer circumferential face of which is formed cylindrical, is used for the intermediate material 12a for making the above worm wheel 5a. Note that, in this embodiment, the synthetic resin 9a composing the outer end portion in the radial direction of this intermediate material 12a contains glass fiber.

Figures 4A, 4B:
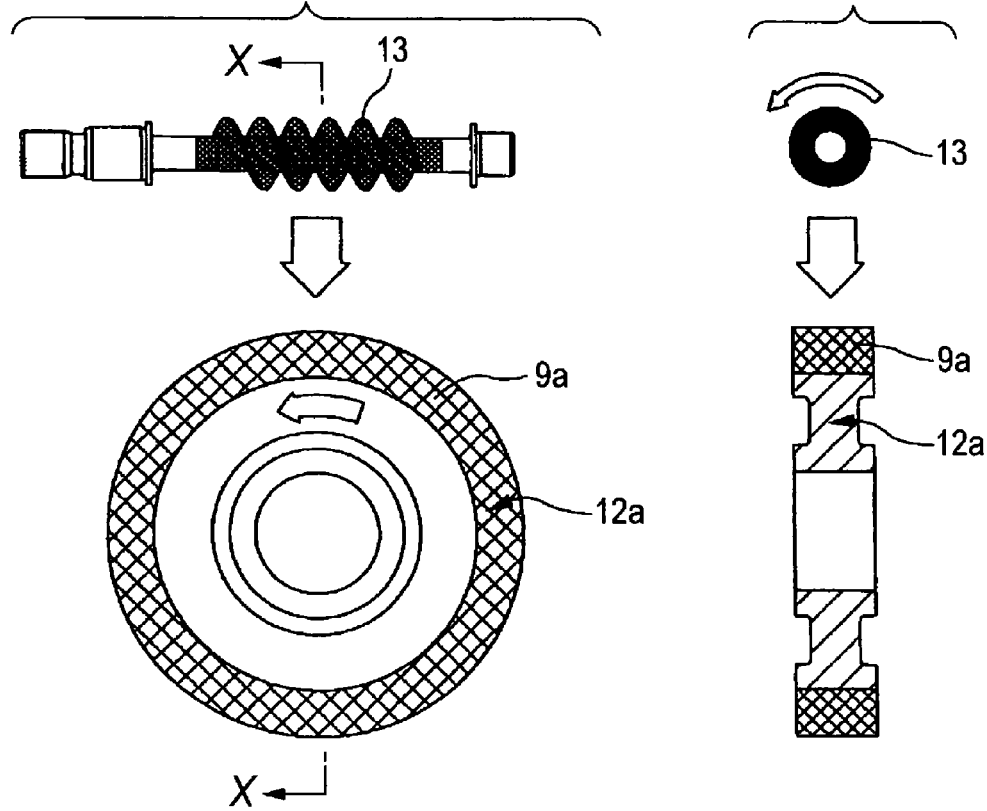
FIG. 4A is a front view showing a method of machining a tooth portion of the worm wheel with the machining worm.
FIG. 4B is a sectional view taken on line X-X in FIG. 4A.
Figure 5:
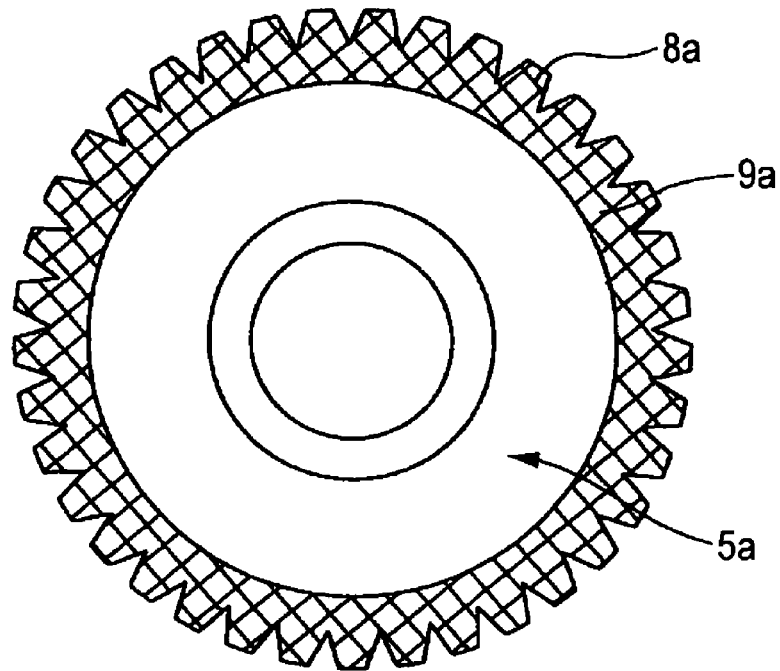
FIG. 5 is a front view of the worm wheel.

In this embodiment, in the case where the tooth portion 8a of the worm wheel 5a is machined with the machining worm 13, as shown in FIG. 4, the central axis of the intermediate material 12a and the central axis of the machining worm 13 are arranged at positions where the two axes are twisted to each other, and the intermediate material 12a and the machining worm 13 are respectively rotated at speeds corresponding to the reduction gear ratio of the worm gear reducer. When the above machining worm 13 is pushed to the outer circumferential face of the above intermediate material 12a under this condition, the outer circumferential face of the above intermediate material 12a is ground (or cut). This grinding (or cutting) work is conducted until a distance between the central axis of the machining worm 13 and the central axis of the intermediate material 12a becomes a predetermined value. For example, a distance between the central axis of the machining worm 13 and the central axis of the intermediate material 12a after the completion of machining becomes a distance between the central axis of the worm wheel after the completion and the central axis of the worm. When machining is conducted as described above, the tooth portion 8a (shown in FIGS. 5 and 6) is formed on the outer circumferential face of the intermediate material 12a.

The outer diameter of the intermediate material 12a before conducting the above machining can be arbitrarily determined. For example, it is possible to determine this outer diameter of the intermediate material 12a so that a sufficiently large clearance can be generated between the tip of the worm wheel, which has been completed, and the root of the worm.

In this connection, as described before, when machining is conducted as described above, the feeding speed of the machining worm 13 toward the intermediate material 12a must be a value approximately not more than a half of the outer diameter of each abrasive grain 14. Therefore, in order to prevent the deterioration of the machining efficiency, the rotating speed of the machining worm 13 is made to be 5 to 10 times as high as that of the conventional hob cutter. Of course, the rotating speed of the intermediate material 12a is increased by the same ratio as that of the rotating speed of the machining worm 13. In this case, machining by the machining worm 13 is conducted by means of dry-machining while the machined portion is being cleaned by air.

In this embodiment, the surface roughness Ra of the tooth face of the worm 3, which is meshed with the worm wheel 5a after the completion as shown in FIG. 6, is made to be not more than 0.1 μm.

In the case of the manufacturing method for a worm wheel of the present embodiment and also in the case of the worm gear reducer of the present embodiment described above, concerning the tool used for machining the tooth portion 8a of the worm wheel 5a, the machining worm 13, the shape and size of which are substantially the same as those of the operational worm 3, is used. Therefore, even when the running-in process described before is not conducted after machining has been completed by the machining worm 13, as shown in FIG. 6, it is possible to extend a contact area of the tooth portion 8a of the worm wheel 5a with the operational worm 3 can be extended, that is, the contact pressure can be decreased. Further, in the present embodiment, the synthetic resin 12a composing the worm wheel 5a contains glass fiber. Therefore, it is possible to ensure a sufficiently high durability of the worm gear reducer.

Figure 20:
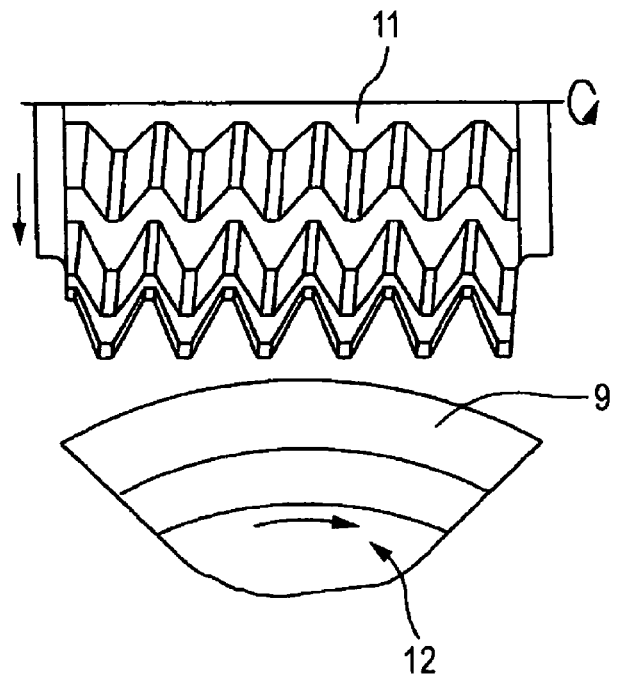
FIG. 20 is a partial front view showing a method of machining a tooth portion of the worm wheel with a hob cutter, which is an example of the conventional method.
Figure 21A:
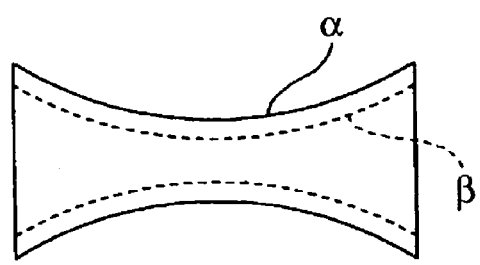
FIGS. 21A and 21B are schematic illustrations showing an outline of the form of a middle-recessed drum worm.
Figure 21B:
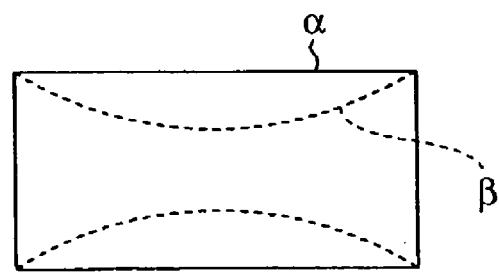

In the case of the present embodiment, being different from the case in which the hob cutter 11 (shown in FIG. 20) is used, the tooth portion formed on the outer circumferential face of the machining worm 13 is spirally continued and no slits are formed in the middle portion. Therefore, even when the machining worm 13 of which shape and size are substantially the same as those of the operational worm 3, that is, when the machining worm 13 of which outer diameter is small is used, the mechanical strength of the machining worm 13 can be sufficiently ensured. Accordingly, even in the case where the synthetic resin 12a composing the worm wheel 5a contains glass fiber as described in this embodiment and the cutting resistance (grinding resistance) of this synthetic resin 12a is high, the durability of the machining worm 13 can be sufficiently ensured.

In this embodiment, machining conducted by the machining worm 13 is executed by means of dry-machining while air-cleaning is being conducted on the portion to be machined. Therefore, when machining is conducted at high rotating speed, the synthetic resin 12a, which has been melted in the above process, can be made into a film-shape by rapid quench and blown away. Therefore, it is possible to prevent the occurrence of clogging of the machining worm 13, and the tooth portion 8b can be effectively machined.

Further, in this embodiment, the surface roughness Ra of the tooth face of the operational worm 3 meshed with the tooth portion 8a of the worm wheel 5a after the completion is made to be not more than 0.1 μm. Therefore, it is possible to reduce a sliding resistance of the meshing portion of the worm wheel 5a with the worm 3, and the worm gear reducer can be highly effectively operated.

Embodiment 2

Figure 8:
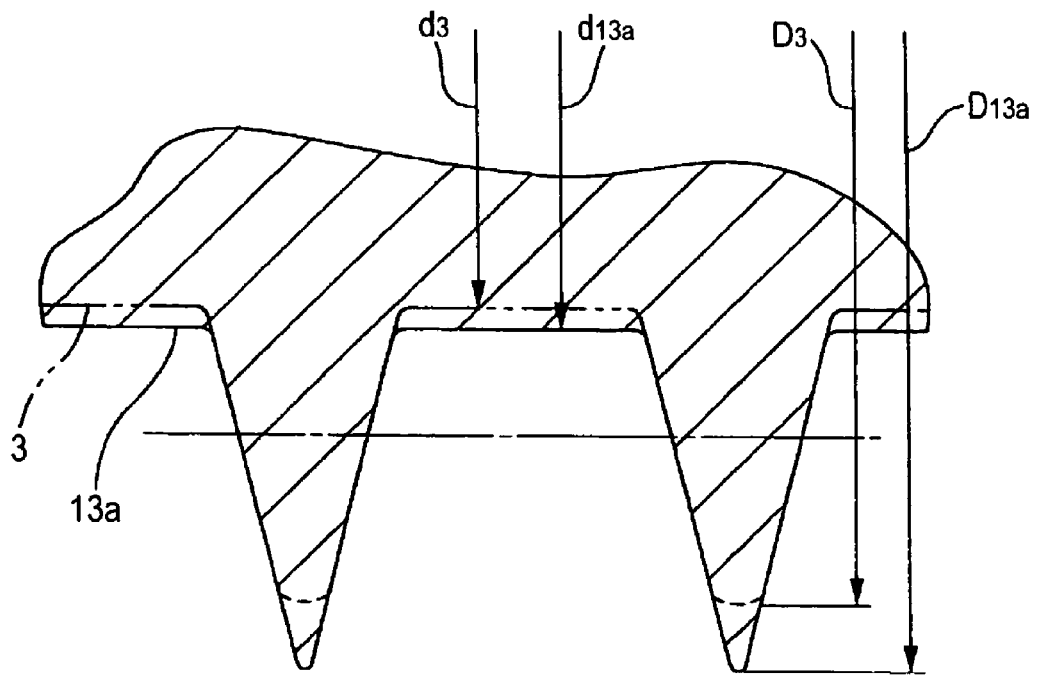
FIG. 8 is a partial sectional view showing a relation of the size between the machining worm and the operational worm in detail.
Figure 11:
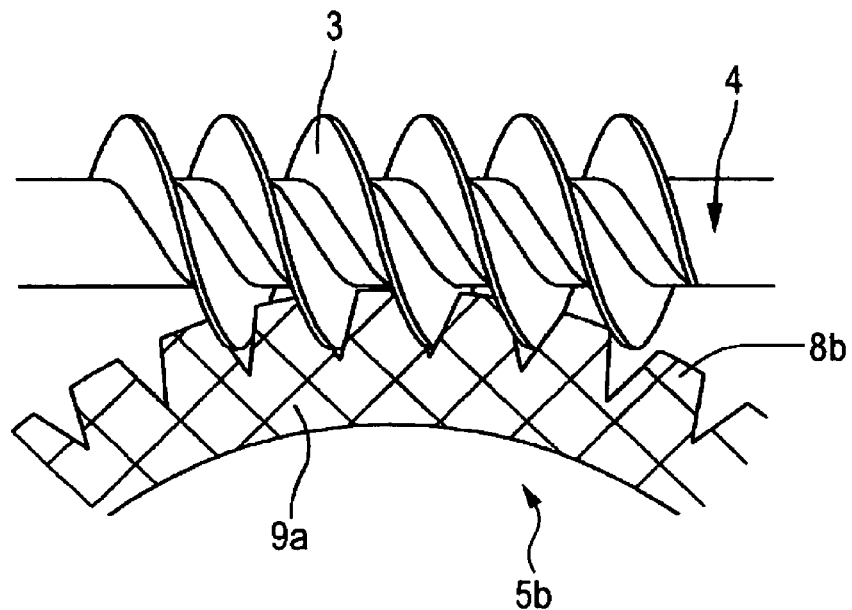
FIG. 11 is an enlarged view corresponding to portion A in FIG. 17 which shows a state in which the worm wheel after machining and the operational worm are meshed with each other.

FIGS. 7 to 11 are views showing Embodiment 2 of the present invention which corresponds to the first and fourth through eighth aspects of the present invention. In this embodiment, concerning the tool used for machining the tooth portion 8b of the worm wheel 5b, the machining worm 13a shown in FIG. 7B is used. This machining worm 13a is composed in such a manner that a large number of abrasive grains 14, 14 (shown in FIG. 2) are electro-deposited on the surface of the worm, the shape and size of which are the same as those of the operational worm 3 meshed with the tooth portion 8b of the worm wheel at the time of use as shown in FIGS. 7A and 11. In this connection, the fine hatched portions (which can be seen as if they were painted out black) shown in FIG. 7B, is a portion in which a large number of abrasive grains 14, 14 are electro-deposited. Due to the foregoing, the portion, on which a large number of abrasive grains are electro-deposited in the machining worm 13a, is made a little larger than the corresponding portion of the operational worm 3. Specifically, although pitch P of the teeth in the axial direction is the same, the diameter $D_{13a}$ of the tip circle and the diameter $d_{13a}$ of the root circle are made a little larger than the diameter $D_3$ of the tip circle of the operational worm 3 and the diameter $d_3$ of the root circle, for example, by 1 to 10% with respect to the operational worm 3, preferably 1 to 3%, and by 0.1 to 1.0 mm in the actual size, preferably 0.1 to 0.3 mm in the actual size. ($D_{13a}$>$D_3$, $d_{13a}$>$d_3$) Accordingly, as the detail is shown in FIG. 8, the diameter $D_{13a}$ of the tip circle of the machining worm 13a shown by a solid line and the diameter $d_{13a}$ of the root circle are a little larger than the diameter $D_3$ of the tip circle of the worm 3 shown by a two-dotted chain line and the diameter $d_3$ of the root circle, that is, $D_{13a}$>$D_3$, $d_{13a}$>$d_3$.

Figure 9:
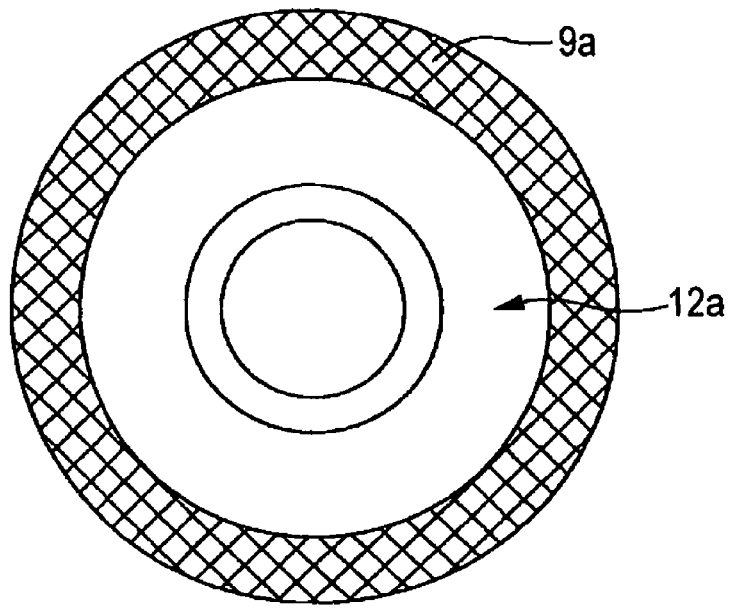
FIG. 9 is a front view showing an intermediate material of the worm wheel.
Figure 10:
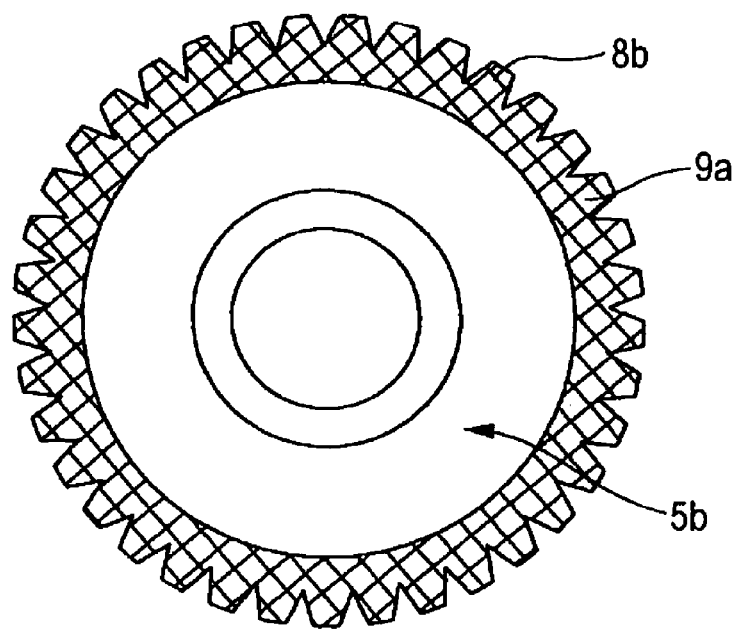
FIG. 10 is a front view showing the worm wheel.

In the same manner as that of Embodiment 1 described before, in this embodiment, concerning the intermediate material 12a for making the above worm wheel 5b, as shown in FIG. 9, the outer circumferential face of the intermediate material 12a is formed into a cylindrical face, and the outer edge portion in the radial direction of the intermediate material 12a is made of the synthetic resin 9a containing glass fiber.

In this embodiment, in the case where the tooth portion 8b of the above worm wheel 5b is machined, the above machining worm 13a is used, and by the same machining method (shown in FIG. 4) as that of Embodiment 1 described before, the outer circumferential face of the intermediate material 12a is ground (or cut).

In the case of the manufacturing method for a worm wheel of the present embodiment and also in the case of the worm gear reducer of the present embodiment described above, in the same manner as that of Embodiment 1, concerning the tool used for machining the tooth portion 8b of the worm wheel 5b, the machining worm 13a, the shape and size of which are substantially the same as those of the operational worm 3, is used. Therefore, even when the running-in process described before is not conducted after machining has been completed by the machining worm 13a, it is possible to extend a contact area of the worm wheel 5b with the operational worm 3, that is, the contact pressure can be decreased.

Especially, in the case of the present embodiment, since the above machining worm 13a is used, as shown in FIG. 11, the clearance of the worm gear reducer, in which the worm wheel after the completion of machining and the worm are meshed with each other, can be made to be a positive value. Accordingly, in the case of the worm gear reducer including the worm wheel 5b manufactured by the manufacturing method of the present embodiment, it is possible to prevent the occurrence of interference of the tip (root) of the worm wheel 5b with the root (tip) of the operational worm 3. As a result, it is possible to prevent the meshing portion of the worm with the worm wheel from being locked. Further, in the entire meshing portion of the worm wheel 5b with the operational worm 3, the clearance can be generated at all times between the tip (root) of the worm wheel 5b and the root (tip) of the worm 3. Therefore, lubricant can easily proceed to between the tip (root) of the worm wheel and the root (tip) of the worm. Accordingly, the meshing portion can be lubricated in an excellent condition. Accordingly, the durability of the worm gear reducer can be sufficiently ensured. Other points of the structure and operation of this embodiment are the same as those of Embodiment 1 described above.

Embodiment 3

Figure 12A:
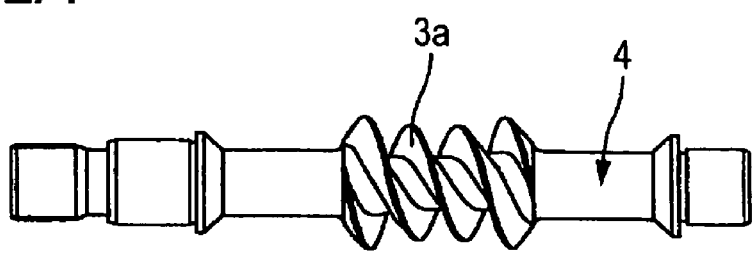
FIG. 12A is a front view showing the operational worm according to Embodiment 3 of the present invention
Figure 12B:
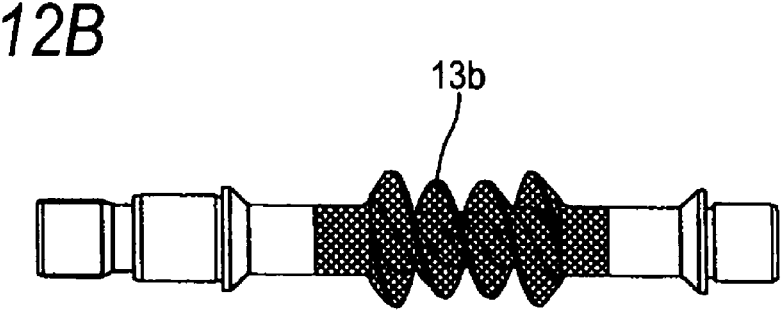
FIG. 12B is a front view showing the machining worm according to Embodiment 3 of the present invention
Figure 13:
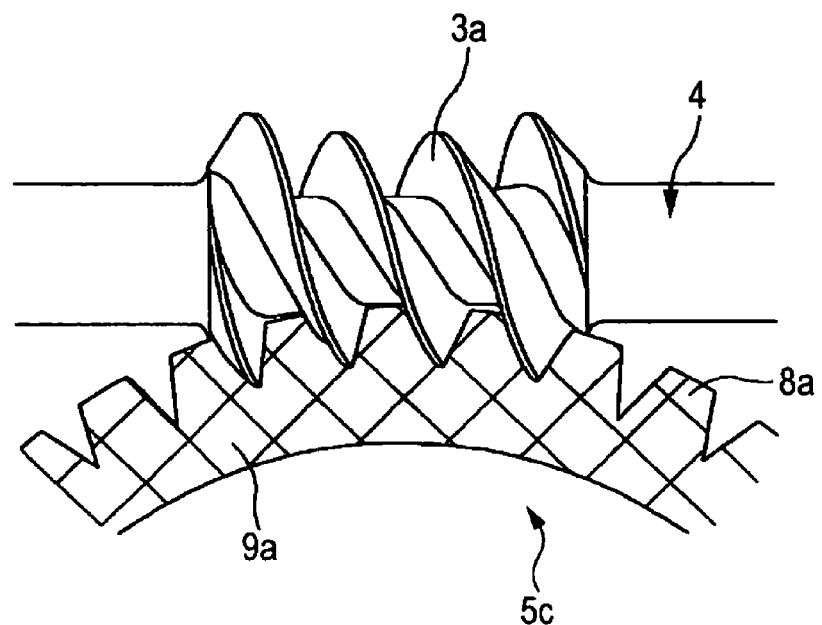
FIG. 13 is an enlarged view corresponding to portion A in FIG. 17 which shows a state in which the worm wheel after machining and the operational worm are meshed with each other.

FIGS. 12 and 13 are views showing Embodiment 3 of the present invention which corresponds to the first and fourth through eighth aspects of the present invention. In the case of Embodiment 1 described before, an object to be manufactured is the worm wheel 5a which is meshed with the cylindrical operational worm 3. On the other hand, in this embodiment, as shown in FIG. 13, an object to be manufactured is the worm wheel 5c which is meshed with the middle-recessed drum worm 3a. In this embodiment, in the same manner as that of Embodiment 1 described before, the machining worm 13b shown in FIG. 12B is composed in such a manner that a large number of abrasive grains 14, 14 (shown in FIG. 2) are electro-deposited on a surface of the middle-recessed drum worm, the shape and size of which are the same as those of the operational worm 3a at the time of use shown in FIGS. 12A and 13. In this connection, the fine hatched portion (which can be seen as if they were painted out black) shown in FIG. 12B is a portion in which a large number of abrasive grains 14, 14 are electro-deposited. The other points of the structure and operation are the same as those of Embodiment 1 described before.

Embodiment 4

Figure 14A:
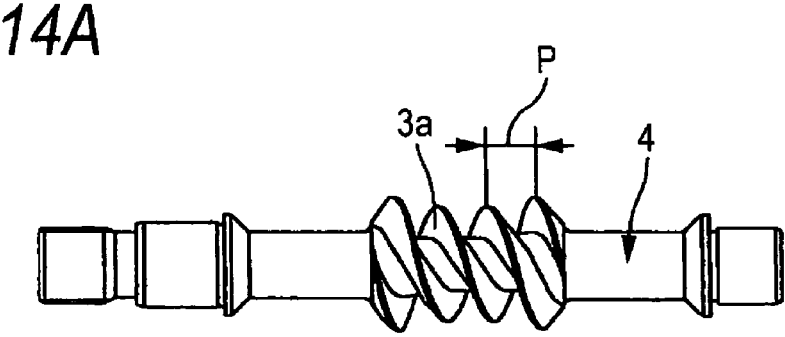
FIG. 14A is a front view showing the operational worm according to Embodiment 4 of the present invention.
Figure 14B:
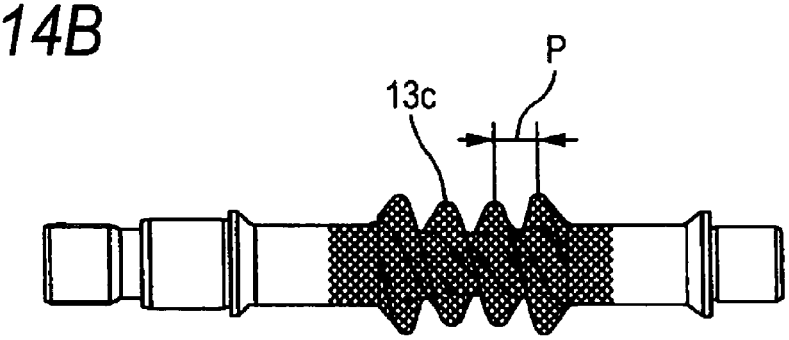
FIG. 14B is a front view showing the machining worm according to Embodiment 4 of the present invention.
Figure 15:
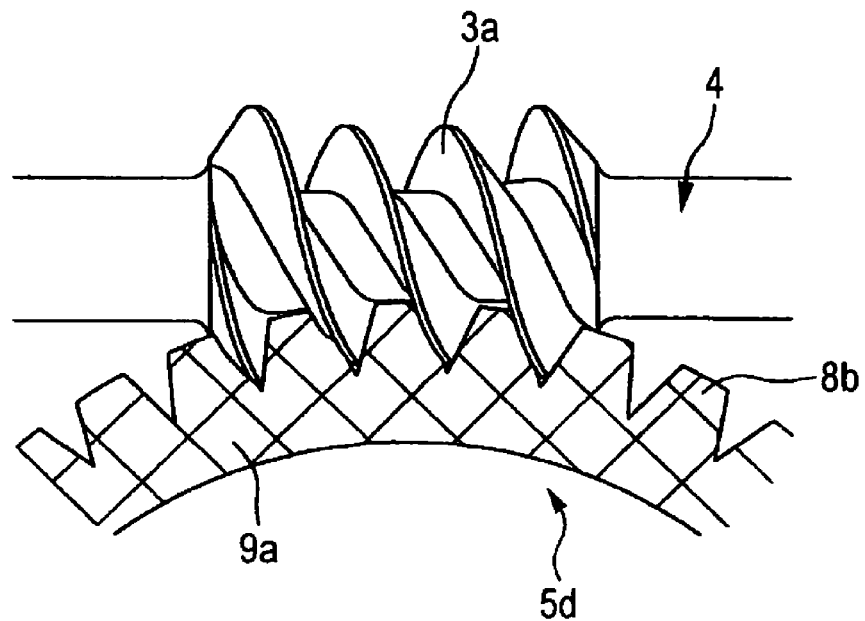
FIG. 15 is an enlarged view corresponding to portion A in FIG. 17 which shows a state in which the worm wheel after machining and the operational worm are meshed with each other.

FIGS. 14 and 15 are views showing Embodiment 4 of the present invention which corresponds to the first, second and fourth through eighth aspects of the present invention. In the case of Embodiment 2 described before, an object to be manufactured is the worm wheel 5b which is meshed with the cylindrical operational worm 3. On the other hand, in this embodiment, as shown in FIG. 15, an object to be manufactured is the worm wheel 5d which is meshed with the middle-recessed drum operational worm 3a. In this embodiment, in the same manner as that of Embodiment 2 described before, a machining worm 13c shown in FIG. 14B is composed in such a manner that, a large number of abrasive grains 14, 14 (shown in FIG. 2) are electro-deposited on a surface of the middle-recessed drum worm in which pitch P in the axial direction is the same and the diameters of the tip circle and the root circle are respectively a little large as compared with the worm 3a at the time of use shown in FIGS. 14A and 15. In this connection, the fine hatched portion (which can be seen as if they were painted out black) shown in FIG. 14B is a portion in which a large number of abrasive grains 14, 14 are electro-deposited. The other points of the structure and operation are the same as those of Embodiment 2 described before.

Embodiment 5

Figure 16:
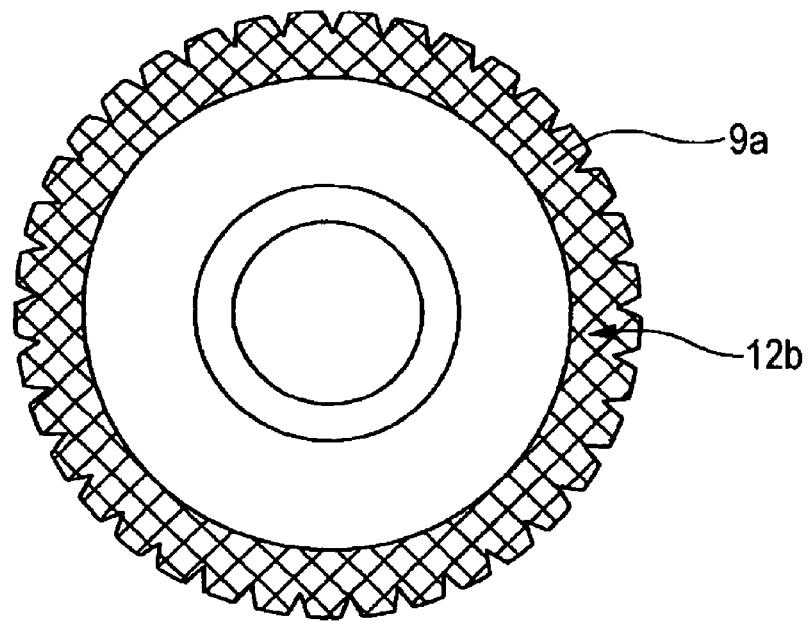
FIG. 16 is a front view of an intermediate material of the worn wheel of Embodiment 5 of the present invention.

FIG. 16 is a view showing Embodiment 5 of the present invention which corresponds to the first through eighth aspects of the present invention. In this embodiment, as shown in FIG. 16, before the tooth portion of the worm wheel is machined with the machining worm, by a means (for example, by means of injection molding of synthetic resin or by means of cutting with a hob cutter of which diameter is larger than that of the machining worm), the shape of the outer circumferential face of the intermediate material 12b for making the worm wheel is formed into a shape which is closer to the shape of the tooth portion after the completion than the cylindrical face.

In the case of this embodiment, a machining removal of the machining worm can be decreased. Therefore, life of the machining worm can be prolonged, and further the entire machining time can be reduced. Accordingly, the manufacturing cost can be decreased. Especially, when injection molding of synthetic resin is adopted as the means except for the machining conducted by the machining worm, it is possible to enhance the yield of material (synthetic resin). Accordingly, the manufacturing cost can be further reduced.

The other points of the structure and operation of this embodiment are the same as those of Embodiments 1 to 4 described before.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A manufacturing method for a worm gear reducer including a worm wheel (5*a*) and an operational worm (3), wherein the worm wheel (5*a*) is meshed with said operational worm (3) at usage, comprising the steps of:
   preparing an operational worm (3) comprising teeth;
   preparing a worm wheel (5*a*), in which at least a surface layer of a tooth portion (8*a*) is made of synthetic resin;
   preparing a machining worm (13), in which pitch of teeth of the machining worm (13) in an axial direction thereof is the same as that of said operational worm (3), and providing abrasive grains (14) on a surface of the machining worm (13) by means of electro-deposition;
   disposing the machining worm (13) in a twisting position relative to the worm wheel (5*a*); and
   rotating the machining worm (13) and the worm wheel (5*a*) with meshing each other so as to machining the tooth portion of the worm wheel (5*a*),
   wherein said operational worm (3) and machining worm (13) are prepared such that the diameter of the tip and root portions of the machining worm ($D_{13a}$, $d_{13a}$) are larger than the diameters of the tip and root portions of the operational worm ($D_3$, $d_3$) by 1 to 10%.

2. A manufacturing method for the worm wheel according to claim 1, further comprising the step of:
   prior to the step of machining of the tooth portion of the worm wheel (5*a*), preparing a cylindrical intermediate material (12*a*) for the worm wheel (5*a*); and
   forming a shape of an outer peripheral face of the intermediate material (12*a*) into a shape close to a shape of the tooth portion (8*a*) of the worm wheel (5*a*) relative to the original cylindrical shape of the intermediate material (12*a*),
   wherein the forming of the shape of the outer peripheral face of the intermediate material (12*a*) is conducted by other than the machining worm (13).

3. The manufacturing method for the worm wheel according to claim 1, wherein the synthetic resin (9*a*) of the worm wheel (5*a*) includes glass fiber.

4. The manufacturing method for a worm wheel according to claim 1, wherein a shape of the operational worm (3) is a cylindrical or a middle-recessed drum shape which has a large diameter portions at both ends thereof and a small diameter portion at a middle thereof.

5. The manufacturing method for a worm wheel according to claim 1, wherein the tooth portion (8*a*) of the worm wheel (5*a*) is machined with the machining worm (13) while a machining portion is cooled by air without using machining oil.

\* \* \* \* \*